US009188487B2

(12) United States Patent
Zhevelev et al.

(10) Patent No.: US 9,188,487 B2
(45) Date of Patent: Nov. 17, 2015

(54) MOTION DETECTION SYSTEMS AND METHODOLOGIES

(71) Applicant: Tyco Fire & Security GmbH, Neuhausen am Rheinfall (CH)

(72) Inventors: Boris Zhevelev, Rishon le Zion (IL); Yaacov Kotlicki, Ramat Gan (IL); Michael Lahat, Kiryat Ono (IL)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 13/677,851

(22) Filed: Nov. 15, 2012

(65) Prior Publication Data

US 2013/0119253 A1 May 16, 2013

Related U.S. Application Data

(60) Provisional application No. 61/560,354, filed on Nov. 16, 2011.

(51) Int. Cl.
*G01J 5/00* (2006.01)
*G01J 5/34* (2006.01)
*G08B 13/191* (2006.01)

(52) U.S. Cl.
CPC *G01J 5/34* (2013.01); *G08B 13/191* (2013.01)

(58) Field of Classification Search
CPC ......... G01J 5/08; G01J 5/0806; G01J 5/0846; G01J 5/14; G01J 5/34; G01J 5/60; G08B 13/191
USPC .................................................... 250/338.3
See application file for complete search history.

(56) References Cited

U.S. PATENT DOCUMENTS

| 3,390,399 A | 6/1968 | Leonard |
| 3,471,212 A | 10/1969 | Sloane |

(Continued)

FOREIGN PATENT DOCUMENTS

| CA | 1254282 | 5/1989 |
| EP | 0233390 | 8/1987 |

(Continued)

OTHER PUBLICATIONS

Patent Cooperation Treaty, International Search Report, mailed Mar. 19, 2013, for International Application No. PCT/IL2012/050462.

(Continued)

*Primary Examiner* — David J Makiya
*Assistant Examiner* — Taeho Jo
(74) *Attorney, Agent, or Firm* — Houston & Associates, LLP

(57) ABSTRACT

A motion detector system including first and second pairs of pyro-electric elements, electrical interconnections between the pyro-electric elements in the first pair providing a first signal output and local temperature compensation for the elements in the first pair, electrical interconnections between the elements in the second pair providing a second signal output and local temperature compensation for the pyro-electric elements in the second pair, wherein the compensation for the first pair is independent of the compensation for the second pair, a housing enclosing the two pairs of pyro-electric elements and defining a window, only one of the pyro-electric elements in each pair viewing a motion detection field of view through the window, and a signal processor receiving the first and second signal outputs and providing an output indication of crossing the field of view by an object having a temperature different from the ambient in the field of view.

23 Claims, 9 Drawing Sheets

(56) References Cited

U.S. PATENT DOCUMENTS

| | | |
|---|---|---|
| 3,524,180 A | 8/1970 | Cruse |
| 3,579,222 A | 5/1971 | Freeman |
| 3,618,059 A | 11/1971 | Allen |
| 3,719,812 A | 3/1973 | Bishop |
| 3,760,402 A | 9/1973 | Magerle |
| 3,792,470 A | 2/1974 | Donovan |
| 3,801,978 A | 4/1974 | Gershberg |
| 3,858,192 A | 12/1974 | Fischer |
| 3,863,230 A | 1/1975 | Reed |
| 3,863,250 A | 1/1975 | McCluskey, Jr. |
| 3,889,250 A | 6/1975 | Solomon |
| 3,958,118 A | 5/1976 | Schwarz |
| 3,961,320 A | 6/1976 | Erdmann |
| 3,973,191 A | 8/1976 | Zabler |
| 3,991,741 A | 11/1976 | Northrup, Jr. |
| 3,997,835 A | 12/1976 | Ando |
| 4,048,980 A | 9/1977 | Googin |
| 4,055,707 A | 10/1977 | McDonald |
| 4,058,726 A | 11/1977 | Paschedag |
| 4,081,680 A | 3/1978 | Keller |
| 4,087,688 A | 5/1978 | Keller |
| 4,091,660 A | 5/1978 | Yanagi |
| 4,123,749 A | 10/1978 | Hartmann et al. |
| 4,134,109 A | 1/1979 | McCormick |
| 4,160,972 A | 7/1979 | La Mell |
| 4,204,881 A | 5/1980 | McGrew |
| 4,208,660 A | 6/1980 | McOwen, Jr. |
| 4,210,391 A | 7/1980 | Cohen |
| 4,225,786 A | 9/1980 | Perlman |
| 4,242,669 A | 12/1980 | Crick |
| 4,245,217 A | 1/1981 | Steinhage |
| 4,271,358 A | 6/1981 | Schwarz |
| 4,271,359 A | 6/1981 | Herwig |
| 4,274,088 A | 6/1981 | Pierson |
| 4,291,312 A | 9/1981 | Kaloi |
| 4,293,196 A | 10/1981 | Hilbert |
| 4,293,852 A | 10/1981 | Rogers |
| 4,317,117 A | 2/1982 | Chasek |
| 4,321,594 A | 3/1982 | Galvin |
| 4,340,283 A | 7/1982 | Cohen |
| 4,359,717 A | 11/1982 | Huber |
| 4,375,034 A | 2/1983 | Guscott |
| 4,383,250 A | 5/1983 | Galvin |
| 4,386,343 A | 5/1983 | Shiveley |
| 4,391,203 A | 7/1983 | Millar |
| 4,391,495 A | 7/1983 | Mazurkewitz |
| 4,429,224 A | 1/1984 | Wagli |
| 4,431,708 A | 2/1984 | Carver |
| 4,458,241 A | 7/1984 | Frankenberg |
| 4,468,658 A | 8/1984 | Rossin |
| 4,479,056 A | 10/1984 | Zierhut |
| 4,480,312 A | 10/1984 | Wingate |
| 4,502,042 A | 2/1985 | Wuhrl |
| 4,510,622 A | 4/1985 | Mori |
| 4,516,115 A | 5/1985 | Frigon |
| 4,547,779 A | 10/1985 | Sanford |
| 4,584,571 A | 4/1986 | Smit et al. |
| 4,594,995 A | 6/1986 | Garrison |
| 4,604,524 A | 8/1986 | Kotlicki |
| 4,605,922 A | 8/1986 | Blattman |
| 4,611,197 A | 9/1986 | Sansky |
| 4,614,938 A | 9/1986 | Weitman |
| 4,645,930 A | 2/1987 | Zierhut |
| 4,660,024 A | 4/1987 | McMaster |
| 4,668,941 A | 5/1987 | Davenport |
| 4,682,030 A | 7/1987 | Rose |
| 4,704,533 A | 11/1987 | Rose |
| 4,709,152 A | 11/1987 | Muller |
| 4,709,153 A | 11/1987 | Schofield |
| 4,717,821 A | 1/1988 | Messiou |
| 4,731,611 A | 3/1988 | Muller |
| 4,734,585 A | 3/1988 | Owers |
| 4,740,701 A | 4/1988 | Wuthrich |
| 4,743,886 A | 5/1988 | Steiner |
| 4,745,398 A | 5/1988 | Abel |
| 4,746,910 A | 5/1988 | Pfister |
| 4,749,254 A | 6/1988 | Seaver |
| 4,751,396 A | 6/1988 | Daigle |
| 4,752,768 A | 6/1988 | Steers |
| 4,752,769 A | 6/1988 | Knaup |
| 4,764,755 A | 8/1988 | Pedtke |
| 4,772,875 A | 9/1988 | Maddox |
| 4,787,722 A | 11/1988 | Claytor |
| 4,800,278 A | 1/1989 | Taniguti |
| 4,837,558 A | 6/1989 | Abel |
| 4,849,635 A | 7/1989 | Sugimoto |
| 4,853,677 A | 8/1989 | Yarbrough |
| 4,857,892 A | 8/1989 | Riordan |
| 4,868,391 A | 9/1989 | Messiou |
| 4,882,567 A | 11/1989 | Johnson |
| 4,893,014 A | 1/1990 | Geck |
| 4,896,039 A | 1/1990 | Fraden |
| 4,897,531 A | 1/1990 | Someya |
| 4,912,748 A | 3/1990 | Horii |
| 4,914,283 A | 4/1990 | Brinckmann |
| 4,943,800 A | 7/1990 | Ikeda |
| 4,971,409 A | 11/1990 | Yeh |
| 4,982,094 A | 1/1991 | Matsuda |
| 5,012,206 A | 4/1991 | Tigges |
| 5,023,594 A | 6/1991 | Wallace |
| 5,055,685 A | 10/1991 | Sugimoto |
| 5,077,548 A | 12/1991 | Dipoala |
| 5,077,549 A | 12/1991 | Hershkovitz |
| 5,084,696 A | 1/1992 | Guscott |
| 5,093,656 A | 3/1992 | Dipoala |
| 5,099,225 A | 3/1992 | Narlow |
| 5,103,234 A | 4/1992 | Watkins |
| 5,117,220 A | 5/1992 | Marino |
| 5,150,127 A | 9/1992 | Aw |
| D331,124 S | 11/1992 | Claytor |
| 5,164,703 A | 11/1992 | Rickman |
| 5,182,564 A | 1/1993 | Burkett |
| 5,191,314 A | 3/1993 | Ackerman |
| 5,192,931 A | 3/1993 | Smith |
| 5,202,692 A | 4/1993 | Huguenin |
| 5,227,667 A | 7/1993 | Takinami et al. |
| 5,237,307 A | 8/1993 | Gritton |
| 5,237,330 A | 8/1993 | Yaccov et al. |
| 5,241,297 A | 8/1993 | Goodman |
| D340,312 S | 10/1993 | Claytor |
| 5,264,733 A | 11/1993 | Tigges |
| 5,268,680 A | 12/1993 | Zantos |
| 5,287,111 A | 2/1994 | Shpater |
| 5,296,707 A | 3/1994 | Nozu |
| 5,315,434 A | 5/1994 | Mizuno |
| 5,355,143 A | 10/1994 | Zurcher |
| 5,416,487 A | 5/1995 | Hampson |
| 5,450,062 A | 9/1995 | DiPoala |
| 5,461,231 A | 10/1995 | Sugimoto |
| 5,465,080 A | 11/1995 | Liddiard |
| 5,468,960 A * | 11/1995 | Sugimoto et al. .......... 250/338.3 |
| 5,473,471 A | 12/1995 | Yamagata |
| 5,475,367 A | 12/1995 | Prevost |
| 5,491,467 A | 2/1996 | Tracy |
| 5,512,874 A | 4/1996 | Poston |
| 5,515,029 A | 5/1996 | Zhevelev |
| 5,517,163 A | 5/1996 | Sagawa |
| 5,519,317 A | 5/1996 | Guichard |
| 5,528,038 A * | 6/1996 | Yoshiike et al. .............. 250/342 |
| 5,530,247 A | 6/1996 | McIver |
| 5,552,778 A | 9/1996 | Schrott et al. |
| 5,555,036 A | 9/1996 | Harnett |
| 5,570,079 A | 10/1996 | Dockery |
| 5,572,033 A | 11/1996 | Grant |
| 5,576,693 A | 11/1996 | Tyren et al. |
| 5,608,377 A | 3/1997 | Zhevlev |
| 5,617,104 A | 4/1997 | Das |
| RE35,534 E | 6/1997 | Claytor |
| 5,652,595 A | 7/1997 | Ahrens |
| 5,656,998 A | 8/1997 | Fujiuchi |
| 5,670,943 A | 9/1997 | DiPoala |
| 5,680,144 A | 10/1997 | Sanad |
| 5,693,943 A | 12/1997 | Tchernihovski |
| 5,703,368 A | 12/1997 | Tomooka |

(56) References Cited

U.S. PATENT DOCUMENTS

| | | | |
|---|---|---|---|
| 5,712,622 A | 1/1998 | Grossinger | |
| 5,731,785 A | 3/1998 | Lemelson | |
| 5,757,270 A | 5/1998 | Mori | |
| 5,760,577 A | 6/1998 | Shizuya | |
| 5,764,145 A | 6/1998 | Hansson | |
| 5,767,672 A | 6/1998 | Guichard | |
| 5,790,025 A | 8/1998 | Amer | |
| 5,815,113 A | 9/1998 | Lo | |
| 5,825,293 A | 10/1998 | Ahmed | |
| 5,834,765 A | 11/1998 | Ashdown | |
| 5,870,022 A | 2/1999 | Kuhnly | |
| 5,900,786 A | 5/1999 | Ito | |
| 5,929,445 A | 7/1999 | Barone | |
| 5,936,524 A | 8/1999 | Zhevelev | |
| 5,942,976 A | 8/1999 | Wieser | |
| 5,963,131 A | 10/1999 | D'Angelo | |
| 5,973,996 A | 10/1999 | Zhevelev | |
| 5,980,123 A | 11/1999 | Heifler | |
| 5,986,549 A | 11/1999 | Teodorescu | |
| 6,031,456 A | 2/2000 | Hanyuda | |
| 6,037,902 A | 3/2000 | Pinhas | |
| 6,078,253 A | 6/2000 | Fowler | |
| 6,150,658 A | 11/2000 | Hagiwara | |
| 6,163,025 A * | 12/2000 | Pantus | 250/338.3 |
| 6,163,257 A | 12/2000 | Tracy | |
| 6,211,522 B1* | 4/2001 | Kotlicki et al. | 250/353 |
| 6,215,399 B1 | 4/2001 | Shpater | |
| 6,222,191 B1 | 4/2001 | Myron | |
| 6,239,437 B1 | 5/2001 | Barone | |
| 6,250,601 B1 | 6/2001 | Kolar | |
| 6,262,661 B1 | 7/2001 | Mahler | |
| 6,285,912 B1* | 9/2001 | Ellison et al. | 700/11 |
| 6,308,272 B1 | 10/2001 | Pearce | |
| 6,324,008 B1 | 11/2001 | Baldwin | |
| 6,384,414 B1 | 5/2002 | Fisher | |
| 6,400,269 B1 | 6/2002 | Savastano | |
| 6,415,205 B1 | 7/2002 | Myron | |
| 6,424,261 B1 | 7/2002 | Williams | |
| 6,465,080 B2 | 10/2002 | Xing | |
| 6,630,754 B1 | 10/2003 | Pippin | |
| 6,653,635 B2 | 11/2003 | Liao | |
| 6,686,841 B1 | 2/2004 | Busch | |
| 6,690,018 B1 | 2/2004 | Barone | |
| 6,756,595 B2 | 6/2004 | Barone | |
| 6,768,294 B1 | 7/2004 | Moldavsky | |
| 6,818,881 B1 | 11/2004 | Chernichovski | |
| 6,933,846 B2 | 8/2005 | Moldavsky | |
| 7,008,063 B2 | 3/2006 | Porter | |
| 7,053,374 B2 | 5/2006 | Barone | |
| 7,075,431 B2 | 7/2006 | Buckley | |
| 7,081,817 B2 | 7/2006 | Zhevelev | |
| 7,115,871 B1 | 10/2006 | Tracy | |
| 7,183,912 B2* | 2/2007 | Micko | 340/545.3 |
| 7,250,605 B2 | 7/2007 | Zhevelev | |
| 7,319,228 B2 | 1/2008 | Zhevelev | |
| 7,399,970 B2* | 7/2008 | Micko | 250/342 |
| 7,504,633 B2 | 3/2009 | Zhevelev | |
| 7,573,032 B2 | 8/2009 | Zhevelev | |
| 7,579,595 B2* | 8/2009 | Micko | 250/338.3 |
| 7,705,310 B2 | 4/2010 | Zhevelev | |
| 7,755,052 B2* | 7/2010 | Micko | 250/342 |
| 7,875,852 B2 | 1/2011 | Zhevelev | |
| 7,875,853 B2 | 1/2011 | Edwards | |
| 8,017,913 B2 | 9/2011 | Zhevelev | |
| 8,035,514 B2* | 10/2011 | Brown et al. | 340/555 |
| 8,138,478 B2 | 3/2012 | Zhevelev | |
| 8,354,643 B2* | 1/2013 | Micko | 250/339.05 |
| 2003/0001096 A1* | 1/2003 | Pompei | 250/349 |
| 2003/0156027 A1 | 8/2003 | Seo | |
| 2004/0124981 A1 | 7/2004 | Moldavsky | |
| 2004/0135688 A1 | 7/2004 | Zhevelev | |
| 2004/0200955 A1 | 10/2004 | Andzelevich | |
| 2005/0030180 A1 | 2/2005 | Pantus | |
| 2005/0045826 A1 | 3/2005 | Barone | |
| 2005/0127298 A1* | 6/2005 | DiPoala | 250/342 |
| 2005/0184869 A1* | 8/2005 | Micko | 340/567 |
| 2005/0236572 A1* | 10/2005 | Micko | 250/342 |
| 2005/0280532 A1 | 12/2005 | Moldavsky | |
| 2006/0087430 A1* | 4/2006 | Zambon | 340/567 |
| 2007/0018106 A1 | 1/2007 | Zhevelev | |
| 2007/0023662 A1* | 2/2007 | Brady et al. | 250/338.3 |
| 2007/0029486 A1 | 2/2007 | Zhevelev | |
| 2007/0145277 A1 | 6/2007 | Zhevelev | |
| 2007/0152156 A1 | 7/2007 | Zhevelev | |
| 2008/0042824 A1* | 2/2008 | Kates | 340/522 |
| 2008/0062255 A1* | 3/2008 | Gal | 348/37 |
| 2008/0278308 A1* | 11/2008 | Kates | 340/522 |
| 2009/0014654 A1 | 1/2009 | Zhevelev | |
| 2009/0146063 A1* | 6/2009 | Zhevelev et al. | 250/349 |
| 2009/0302220 A1* | 12/2009 | Micko | 250/338.3 |
| 2009/0302222 A1 | 12/2009 | Zhevelev | |
| 2009/0309029 A1 | 12/2009 | Zhevelev | |
| 2010/0141153 A1* | 6/2010 | Recker et al. | 315/149 |

FOREIGN PATENT DOCUMENTS

| | | |
|---|---|---|
| EP | 0342175 | 11/1989 |
| EP | 0481934 | 4/1992 |
| EP | 0499177 | 8/1992 |
| EP | 0646986 | 4/1995 |
| GB | 1532518 | 11/1978 |
| GB | 2131232 | 6/1984 |
| GB | 2141228 | 12/1984 |
| GB | 2207523 | 2/1989 |
| GB | 2284668 | 6/1995 |
| GB | 2306649 | 5/1997 |
| GB | 2306650 | 5/1997 |
| GB | 2326237 | 12/1998 |
| GB | 2327301 | 1/1999 |
| GB | 2332955 | 7/1999 |
| GB | 2369450 | 5/2002 |
| JP | 408240482 | 9/1996 |
| WO | 96/06865 | 3/1996 |
| WO | 96/27219 | 9/1996 |
| WO | 01/51894 | 7/2001 |
| WO | 01/79887 | 10/2001 |
| WO | 02/082004 | 10/2002 |
| WO | 2006/100672 | 9/2006 |
| WO | 2007/090458 | 8/2007 |
| WO | 2008/012805 | 1/2008 |
| WO | 2008/012823 | 1/2008 |
| WO | 2013/072916 | 5/2013 |

OTHER PUBLICATIONS

U.S. Appl. No. 61/560,354, filed Nov. 16, 2011.
An International Search Report dated Aug. 21, 1995, which issued during the prosecution of Applicant's PCT/EP95/01501.
An Office Action dated Feb. 15, 2011, which issued during the prosecution of U.S. Appl. No. 12/374,084.
Perkins T. O. III, Active Microstrip Circular Patch Antenna; Microwave Journal vol. 30 (Mar. 1987) pp. 109-117. Abstract only.
RCA Review, vol. 47, Dec. 1986, Ultrastable Low-Noise GaAs FET Oscillator with Dielctronic Res-onator, pp. 472-486. Abstract only.
IEEE, A.S. P. Khanna, Review of Dielectric Resonator Oscillator Technology pp. 478-486. 1987.
IEEE, Transaction on Microwave Theory and Techniques, vol. Mtt-26, No. 3, Mar 1978, pp. 156-162. Abstract Only.
IEEE, Transaction on Microwave Theory and Techniques, vol. Mtt-28, No. 8, Aug. 1980 pp. 817-824. Abstract Only.
IEEE, A 10.5 GHz MIC Direction Sensitive Doppler Module Using a GaAs FET and A Ag/Pd Thick Film, 1981, pp. 319-320. Abstract Only.
D'Auria L. et al., Photolithographic fabrication of thin film lenses, Optice Communications, 1972, vol. 5, No. 4, pp. 232-235. Abstract Only.
U.S Appl. No. 60/664,231, filed Mar. 21, 2005.
An International Search Report dated Oct. 25, 2001, which issued during the prosecution of Applicant's PCT/IL01/00357/01501.
An International Preliminary Report on Patentability dated Mar. 26, 2002, which issued during the prosecution of Applicant's PCT/IL01/00357/01501.

(56) References Cited

OTHER PUBLICATIONS

An International Search Report dated Feb. 6, 2003, which issued during the prosecution of Applicant's PCT/IL02/00272.
An International Preliminary Report on Patentability dated Aug. 31, 2004, which issued during the prosecution of Applicant's PCT/IL02/00272.
U.S Appl. No. 60/281,209, filed Oct. 17, 2002.
An Office Action dated Jul. 14, 2004, which issued during the prosecution of U.S. Appl. No. 10/257,501.
A Notice of Allowance dated Mar. 28, 2005, which issued during the prosecution of U.S. Appl. No. 10/257,501.
An Office Action dated Jan. 28, 2005, which issued during the prosecution of U.S. Appl. No. 10/474,139.
An Office Action dated Oct. 18, 2005, which issued during the prosecution of U.S. Appl. No. 10/474,139.
A Notice of Allowance dated Apr. 26, 2006, which issued during the prosecution of U.S. Appl. No. 10/474,139.
An Office Action dated Mar. 3, 2008, which issued during the prosecution of U.S. Appl. No. 11/190,628.
U.S. Appl. No. 60/834,367, filed Jul. 27, 2006.
An International Search Report and a Written Opinion both dated Nov. 29, 2007, which issued during the prosecution of Applicant's PCT/IL2006/000356.
An International Preliminary Report on Patentability dated Dec. 17, 2007, which issued during the prosecution of Applicant's PCT/IL2006/000356.
An Office Action dated Aug. 15, 2011, which issued during the prosecution of U.S. Appl. No. 10/596,695.
A Notice of Allowance dated Jan. 19, 2012, which issued during the prosecution of U.S. Appl. No. 10/596,695.
An Office Action dated Jan. 16, 2007, which issued during the prosecution of U.S. Appl. No. 11/425,749.
A Notice of Allowance dated Jun. 27, 2011, which issued during the prosecution of U.S. Appl. No. 12/374,084.
A Notice of Allowance dated Aug. 7, 2007, which issued during the prosecution of U.S. Appl. No. 11/425,749.
An Office Action dated Jan. 17, 2008, which issued during the prosecution of U.S. Appl. No. 11/425,759.
An Office Action dated Sep. 17, 2008, which issued during the prosecution of U.S. Appl. No. 11/425,759.
A Notice of Allowance dated Apr. 3, 2009, which issued during the prosecution of U.S. Appl. No. 11/425,759.
An Office Action dated Nov. 1, 2007, which issued during the prosecution of U.S. Appl. No. 11/425,770.
An Office Action dated Apr. 30, 2008, which issued during the prosecution of U.S. Appl. No. 11/425,770.
A Notice of Allowance dated Oct. 31, 2008, which issued during the prosecution of U.S. Appl. No. 11/425,770.
A Notice of Allowance dated Mar. 21, 2007, which issued during the prosecution of U.S. Appl. No. 11/425,780.
An Office Action dated Feb. 6, 2009, which issued during the prosecution of U.S. Appl. No. 11/744,176.
An Interview Summary dated Dec. 1, 2009, which issued during the prosecution of U.S. Appl. No. 11/744,176.
A Notice of Allowance dated Jan. 4, 2010, which issued during the prosecution of U.S. Appl. No. 11/744,176.
An International Search Report dated Mar. 19, 2013, which issued during the prosecution of Applicant's PCT/IL2012/050462.
An International Search Report and a Written Opinion both dated Mar. 5, 2008, which issued during the prosecution of Applicant's PCT/IL2007/000939.
An International Preliminary Report on Patentability dated Mar. 17, 2009, which issued during the prosecution of Applicant's PCT/IL2007/000939.
An International Search Report and a Written Opinion both dated May 20, 2008, which issued during the prosecution of Applicant's PCT/IL2007/000915.
An International Preliminary Report on Patentability dated Mar. 17, 2009, which issued during the prosecution of Applicant's PCT/IL2007/000915.
An Office Action dated Jun. 24, 2010, which issued during the prosecution of U.S. Appl. No. 12/227,274.
A Notice of Allowance dated Oct. 18, 2010, which issued during the prosecution of U.S. Appl. No. 12/227,274.
An Office Action dated Sep. 2, 2010, which issued during the prosecution of U.S. Appl. No. 12/374,084.

* cited by examiner

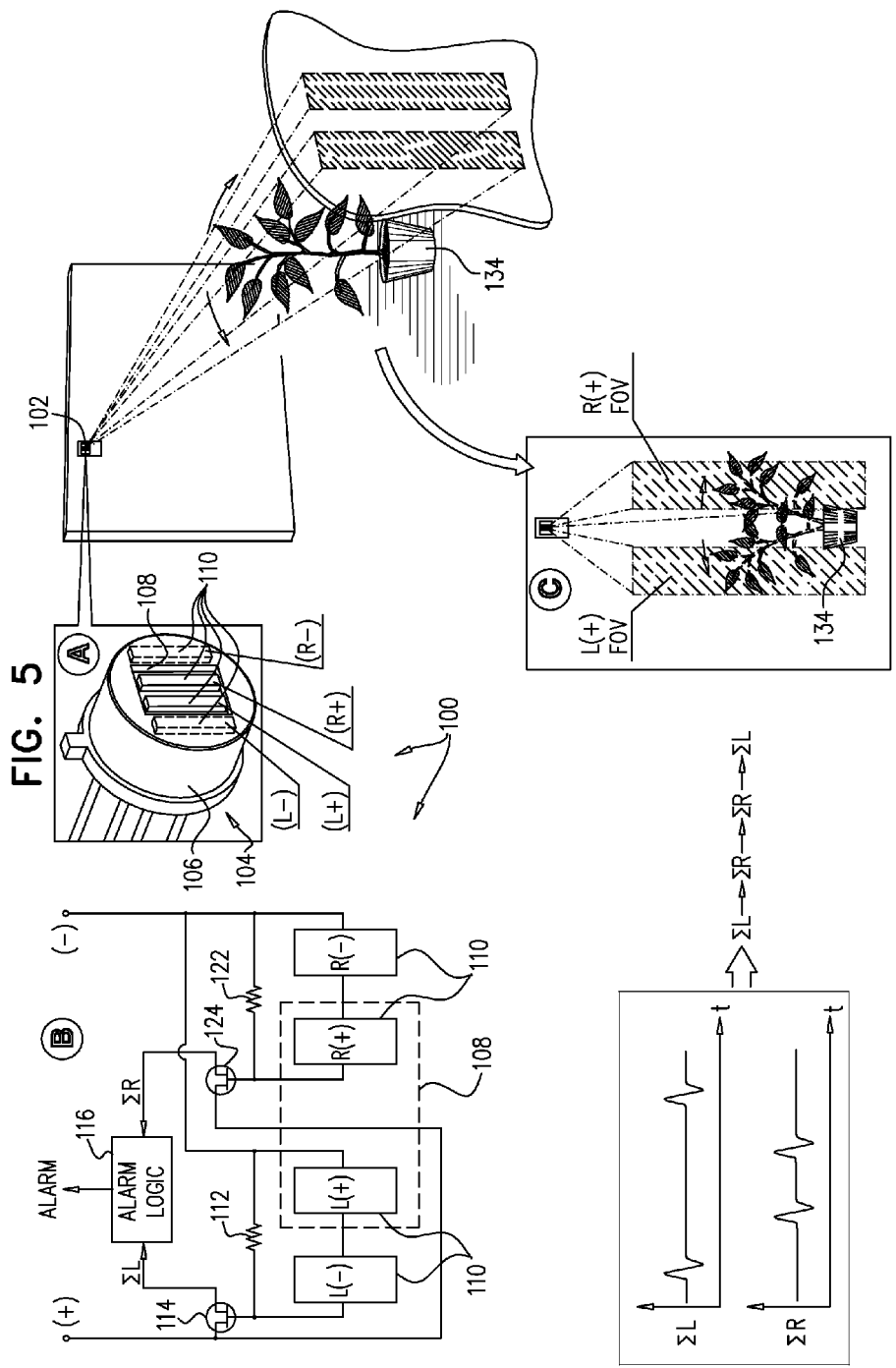

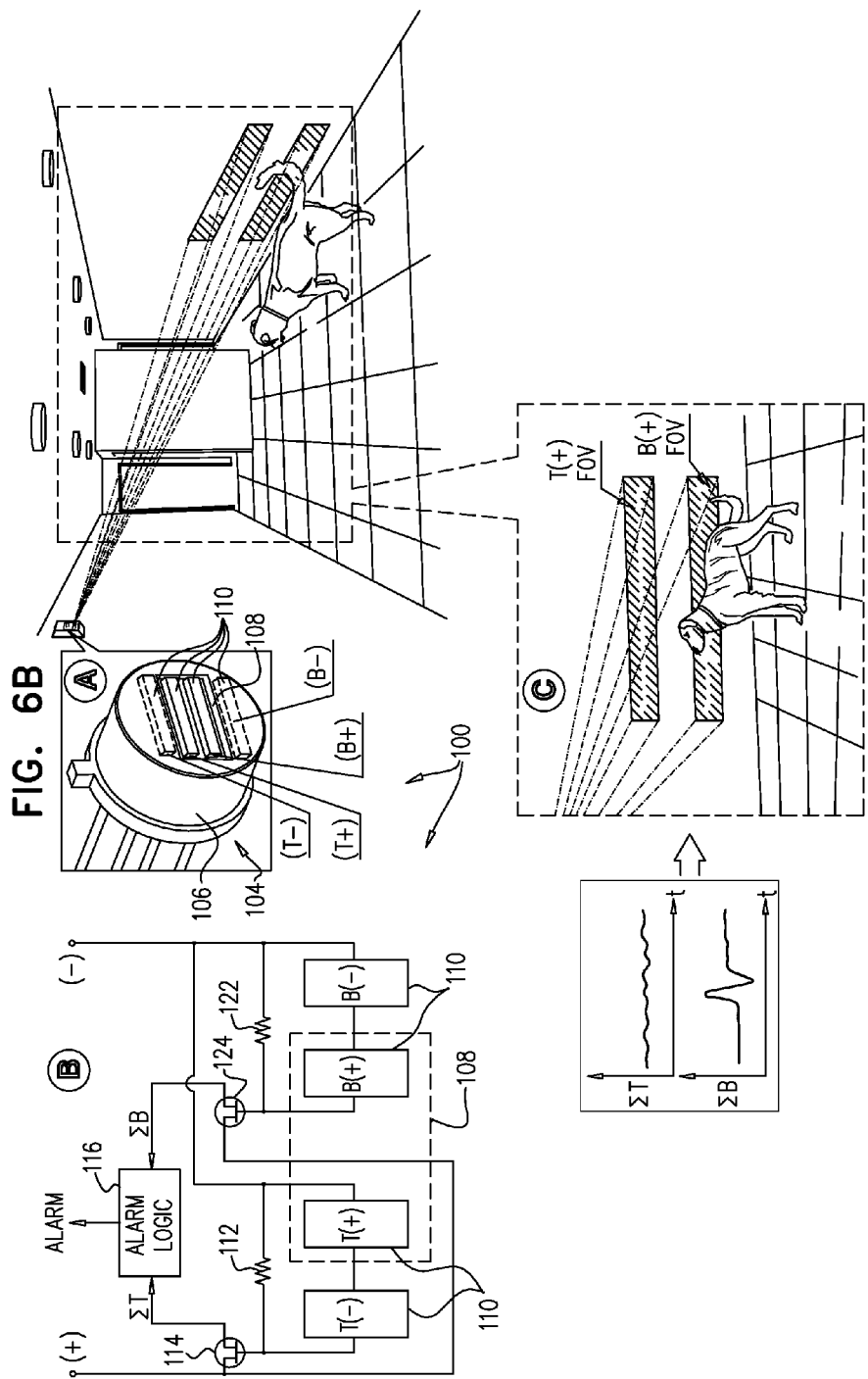

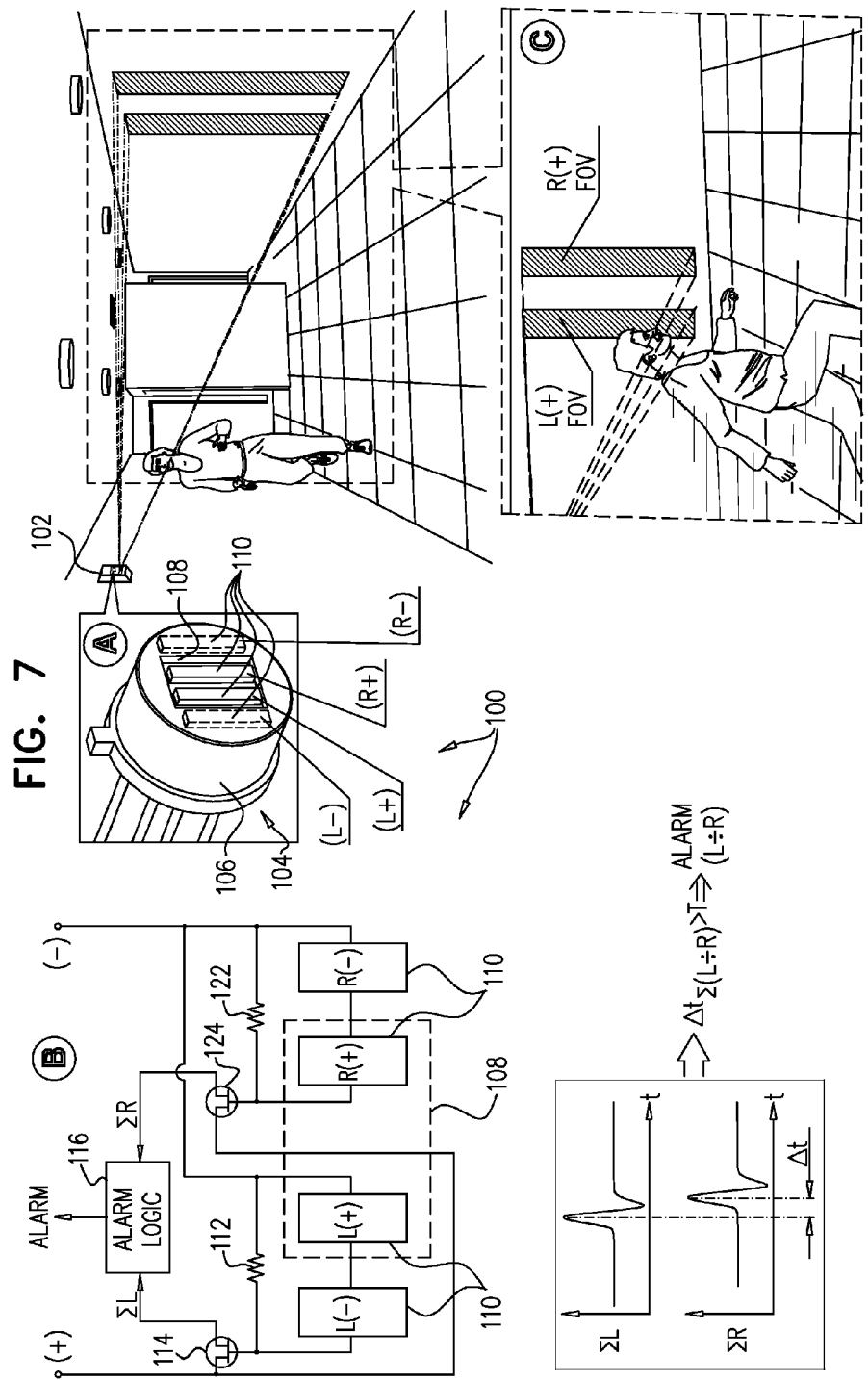

MOTION DETECTION SYSTEMS AND METHODOLOGIES

REFERENCE TO RELATED APPLICATIONS

The present application is related to the U.S. Provisional Patent Application Ser. No. 61/560,354, filed on Nov. 16, 2011 and entitled "QUAD ELEMENT, SEPARATED OUTPUT, PARTIALLY CONCEALED PYRO SENSOR", the disclosure of which is hereby incorporated by reference and priority of which is hereby claims pursuant to 37 CFR 1.78(a) (4) and (5)(i).

FIELD OF THE INVENTION

The present invention relates to motion detection systems generally and more particularly to novel motion detection systems incorporating pyro-electric sensors and to novel pyro-electric sensors useful therein.

BACKGROUND OF THE INVENTION

Various types of motion detection systems are known and are in widespread use. These include, inter alia, systems developed and manufactured by Visonic Ltd. and its successor company Tyco International, Inc.

SUMMARY OF THE INVENTION

The present invention seeks to provide improved motion detection systems and methodologies. There is thus provided in accordance with a preferred embodiment of the present invention a motion detector system including at least first and second pairs of pyro-electric elements, electrical interconnections between the pyro-electric elements in the first pair of pyro-electric elements providing a first signal output and local temperature compensation for the two pyro-electric elements in the first pair, electrical interconnections between the pyro-electric elements in the second pair of pyro-electric elements providing a second signal output and local temperature compensation for the two pyro-electric elements in the second pair, wherein the local temperature compensation for the two pyro-electric elements in the first pair is independent of the local temperature compensation for the two pyro-electric elements in the second pair, a housing enclosing the at least first and second pairs of pyro-electric elements and defining a window, only one of the pyro-electric elements in the first pair and only one of the pyro-electric elements in the second pair viewing a motion detection field of view through the window, and a signal processor electrically receiving the first signal output and the second signal output and providing an output indication of crossing the field of view by an object having a temperature different from the ambient in the field of view.

Preferably, the signal processor is operative to provide detection of crossing the field of view by an object at an angular velocity of between 1 and 2 degrees per second. Preferably, the signal processor is operative to disregard repeated crossing of the field of view in opposite directions by an object at an angular velocity less than 0.5 degrees per second.

In accordance with a preferred embodiment of the present invention, the signal processor provides an output indication of direction of crossing the field of view by an object having a temperature different from the ambient in the field of view. Additionally or alternatively, the signal processor provides an alarm output indication in respect of crossing the field of view by an object having a temperature different from the ambient in the field of view in a first general direction and not in respect of crossing the field of view by an object having a temperature different from the ambient in the field of view in a second general direction opposite to the first general direction.

Additionally or alternatively, the signal processor provides a first output indication in respect of crossing the field of view by an object having a temperature different from the ambient in the field of view in a first general direction and a second output indication in respect of crossing the field of view by an object having a temperature different from the ambient in the field of view in a second general direction opposite to the first general direction.

Additionally or alternatively, the signal processor provides an alarm output indication in respect of crossing the field of view by an object having a temperature different from the ambient in the field of view and not in respect of a stationary object having a temperature different from the ambient in the field of view.

Additionally or alternatively, the signal processor provides an alarm output indication in respect of crossing the field of view by an object having a temperature different from the ambient in the field of view and not in respect of a stationary object outside of the field of view having a temperature different from the ambient in the field of view.

Additionally or alternatively, the signal processor provides an alarm output indication in respect of crossing the field of view by an object having a temperature different from the ambient in the field of view and not in respect of repeated back-and-forth crossings of the field of view by an object having a temperature different from the ambient in said field of view.

Additionally or alternatively, the signal processor provides an alarm output indication in respect of crossing the field of view by a human and not in respect of crossing the field of view by a pet.

There is also provided in accordance with another preferred embodiment of the present invention a method for detecting motion, the method including electrically interconnecting between the pyro-electric elements of a first pair of pyro-electric elements, providing a first signal output and local temperature compensation for the two pyro-electric elements in the first pair, electrically interconnecting between the pyro-electric elements of a second pair of pyro-electric elements, providing a second signal output and local temperature compensation for the two pyro-electric elements in the second pair, wherein the local temperature compensation for the two pyro-electric elements in the first pair is independent of the local temperature compensation for the two pyro-electric elements in the second pair, enclosing the at least first and second pairs of pyro-electric elements and defining a window, only one of the pyro-electric elements in the first pair and only one of the pyro-electric elements in the second pair viewing a motion detection field of view through the window, and electrically receiving the first signal output and the second signal output and providing an output indication of crossing the field of view by an object having a temperature different from the ambient in the field of view.

Preferably, providing an output indication is responsive to detection of crossing the field of view by an object at an angular velocity of between 1 and 2 degrees per second. Preferably, the method also includes disregarding repeated crossing of the field of view in opposite directions by an object at an angular velocity less than 0.5 degrees per second.

In accordance with a preferred embodiment of the present invention, the method also includes providing an output indication of direction of crossing the field of view by an object having a temperature different from the ambient in the field of view.

Preferably, the method also includes providing an alarm output indication in respect of crossing the field of view by an object having a temperature different from the ambient in the field of view in a first general direction and not in respect of crossing the field of view by an object having a temperature different from the ambient in the field of view in a second general direction opposite to the first general direction.

Preferably, the method also includes providing a first output indication in respect of crossing the field of view by an object having a temperature different from the ambient in the field of view in a first general direction and a second output indication in respect of crossing the field of view by an object having a temperature different from the ambient in the field of view in a second general direction opposite to the first general direction.

Preferably, the method also includes providing an alarm output indication in respect of crossing the field of view by an object having a temperature different from the ambient in the field of view and not in respect of a stationary object having a temperature different from the ambient in the field of view.

Preferably, the method also includes providing an alarm output indication in respect of crossing the field of view by an object having a temperature different from the ambient in the field of view and not in respect of a stationary object outside of the field of view having a temperature different from the ambient in the field of view.

Preferably, the method also includes providing an alarm output indication in respect of crossing the field of view by an object having a temperature different from the ambient in the field of view and not in respect of repeated back-and-forth crossings of the field of view by an object having a temperature different from the ambient in the field of view.

Preferably, the method also includes providing an alarm output indication in respect of crossing the field of view by a human and not in respect of crossing the field of view by a pet.

There is further provided in accordance with yet another preferred embodiment of the present invention a pyro-electric sensor including at least first and second pairs of pyro-electric elements, electrical interconnections between the pyro-electric elements in the first pair of pyro-electric elements, providing a first signal output and local temperature compensation for the two pyro-electric elements in the first pair, electrical interconnections between the pyro-electric elements in the second pair of pyro-electric elements, providing a second signal output and local temperature compensation for the two pyro-electric elements in the second pair, wherein the local temperature compensation for the two pyro-electric elements in the first pair is independent of the local temperature compensation for the two pyro-electric elements in the second pair, and a housing enclosing the at least first and second pairs of pyro-electric elements and defining a window, only one of the pyro-electric elements in the first pair and only one of the pyro-electric elements in the second pair viewing a motion detection field of view through the window.

There is yet further provided in accordance with still another preferred embodiment of the present invention a method for pyro-electric sensing, the method including electrically interconnecting between the pyro-electric elements of a first pair of pyro-electric elements, providing a first signal output and local temperature compensation for the two pyro-electric elements in the first pair, electrically interconnecting between the pyro-electric elements of a second pair of pyro-electric elements, providing a second signal output and local temperature compensation for the two pyro-electric elements in the second pair, wherein the local temperature compensation for the two pyro-electric elements in the first pair is independent of the local temperature compensation for the two pyro-electric elements in the second pair, and enclosing the at least first and second pairs of pyro-electric elements and defining a window, only one of the pyro-electric elements in the first pair and only one of the pyro-electric elements in the second pair viewing a motion detection field of view through the window.

BRIEF DESCRIPTION OF THE DRAWINGS

The present invention will be understood and appreciated more fully from the following detailed description, taken in conjunction with the drawings in which:

FIG. 5 is a simplified illustration of operation of the motion detection system of FIG. 1, showing how the system eliminates false alarms due to repeated back-and-forth crossings;

FIGS. 6A and 6B are simplified illustrations of operation of the motion detection system, showing how the system differentiates between a crossing of a human and a crossing of a pet;

FIG. 7 is a simplified illustration of operation of the motion detection system of FIG. 1, showing how the system detects a crossing in a single direction at a high angular velocity.

DETAILED DESCRIPTION OF PREFERRED EMBODIMENTS

Figure 1:
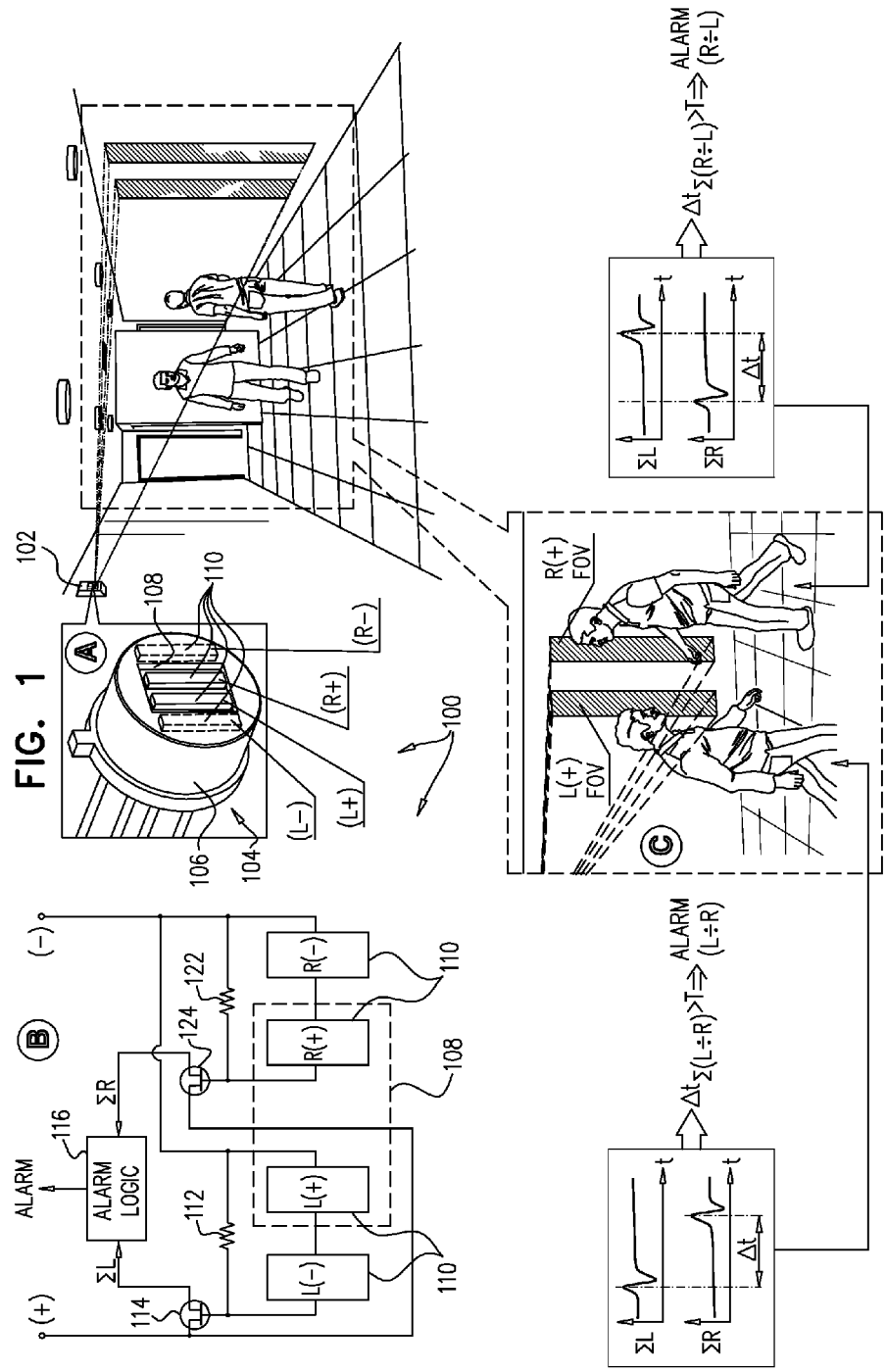
FIG. 1 is a simplified illustration of the operation of a motion detection system constructed and operative in accordance with a preferred embodiment of the present invention showing how the system differentiates between crossings in opposite directions.

Reference is now made to FIG. 1, which is a simplified illustration of the operation of a motion detection system constructed and operative in accordance with a preferred embodiment of the present invention showing how the system differentiates between crossings in opposite directions.

As seen in FIG. 1, there is provided a motion detection system 100 including at least one detector 102 including focusing optics (not shown) which focus infra-red radiation from fields of view onto a sensor 104. In accordance with a preferred embodiment of the present invention, the sensor 104 includes a housing 106 defining a window 108.

Disposed within housing 106 are first and second pairs of pyro-electric elements 110, which are respectively designated L+ & L− and R+ & R−. Typically, all of the pyro-electric elements 110 are identical and their L and R designations indicate only that they are on respective left and right sides of sensor 104 as seen in enlargement A in FIG. 1.

In accordance with a preferred embodiment of the present invention, the pyro-electric elements 110 of each pair are electrically connected with opposite polarity therebetween, such that the electrically connected first pair of pyro-electric elements 110 (L+ & L−) provides a first summed signal output and local temperature compensation therefor. Similarly, the electrically connected second pair of pyro-electric elements 110 (R+ & R−) provides a second summed signal output and local temperature compensation therefor.

It is a particular feature of an embodiment of the present invention that the local temperature compensation for the two pyro-electric elements 110 in the first pair (L+ & L−) is independent of the local temperature compensation for the two pyro-electric elements 110 in said second pair (R+ & R−).

It is an important feature of an embodiment of the present invention that the housing 106 is constructed such that only one of the pyro-electric elements 110 in the first pair and only one of the pyro-electric elements in the second pair view a motion detection field of view through window 108. Housing 106 prevents infra-red radiation from the motion detection field of view in the wavelength bands of interest from reaching the other one of the pyro-electric elements 110 in each pair, here L− & R−. The pyro-electric elements 110 which are thus blocked from viewing the motion detection field of view by housing 106 provide local temperature compensation for the respective pyro-electric elements, here L+ & R+, which are within window 108 and are paired therewith.

In accordance with a preferred embodiment of the present invention a signal processor electrically receives the first and second summed signal outputs and provides an output indication of crossing of the motion detection field of view by an object having a temperature different from the ambient in the motion detection field of view. Preferably, the signal processor is operative to disregard repeated crossing of the field of view in opposite directions by an object at an angular velocity less than 0.5 degrees per second.

In a simplified circuit diagram designated B in FIG. 1, it is seen that pyro-electric elements L+ & L− are electrically connected in series across a resistance 112 and together generate a signal which is the sum of their respective outputs and is supplied via a FET 114 to alarm logic 116, which includes the signal processor mentioned above. Similarly, it is seen that pyro-electric elements R+ & R− are electrically connected in series across a resistance 122 and together generate a signal which is the sum of their respective outputs and is supplied via a FET 124 to alarm logic 116.

It is further seen that the motion of a person moving from left to right as seen in enlargement C in FIG. 1, produces summed L and R outputs, which comprise an L peak and an R peak, respectively. As clearly shown, the L peak leads the R peak by a time interval denoted as Delta T, and therefore indicates movement of a person from left to right in the sense of enlargement C.

Similarly, it is further seen that the motion of a person moving from right to left as seen in enlargement C in FIG. 1, also produces summed L and R outputs, which comprise an L peak and an R peak, respectively. As clearly shown, the R peak leads the L peak by a time interval denoted as Delta T, and therefore indicates movement of a person from right to left in the sense of enlargement C.

Alarm logic 116 is operative to ascertain that at least a minimum time difference Delta T between the R and L peaks is present and to distinguish between signals which indicate right to left motion and left to right motion.

Figure 2:
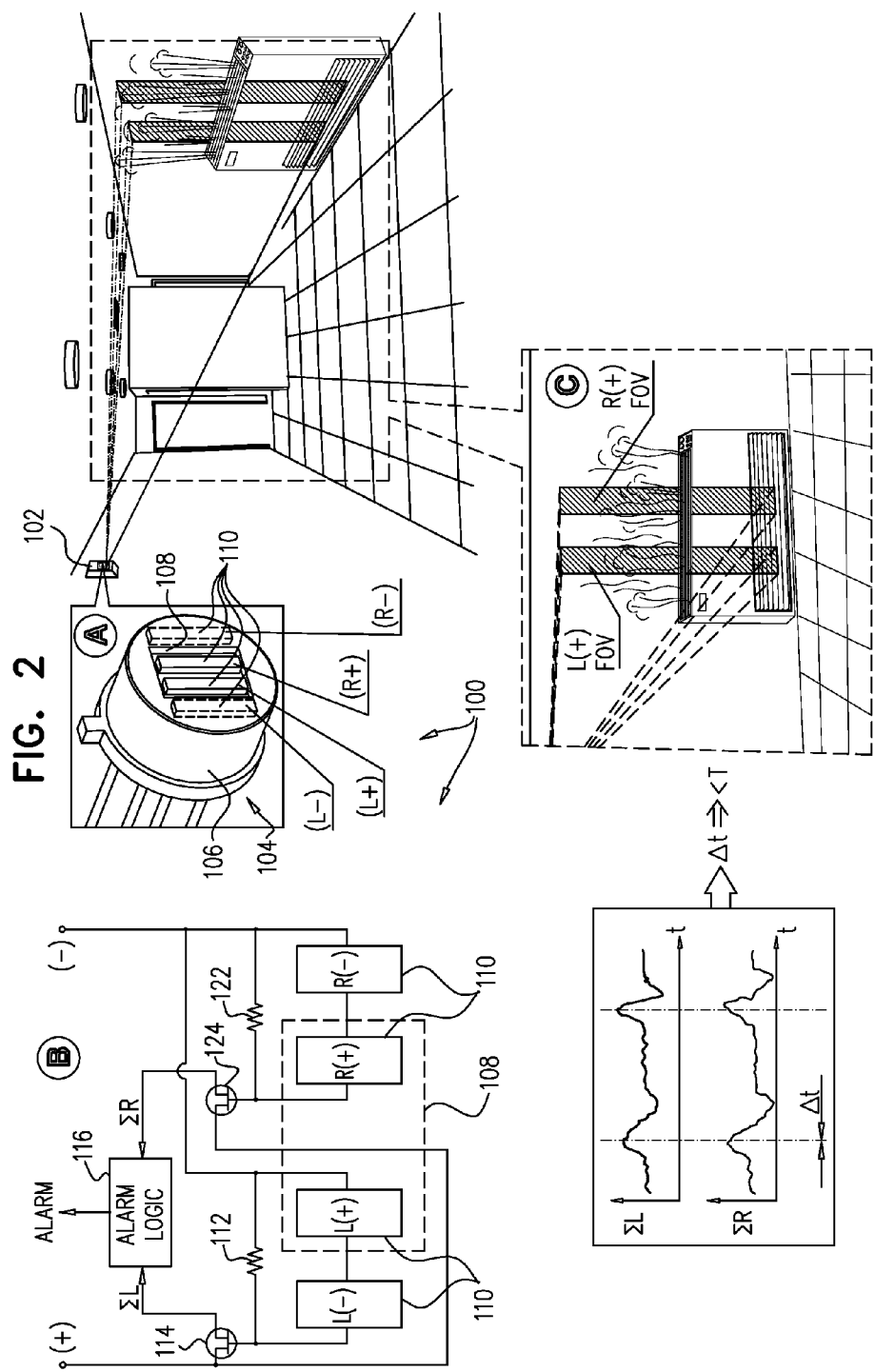
FIG. 2 is a simplified illustration of operation of the motion detection system of FIG. 1, showing how the system eliminates false alarms due to thermal effects within the system field of view.

Reference is now made to FIG. 2, which is a simplified illustration of operation of the motion detection system of FIG. 1, showing how the system eliminates false alarms due to thermal effects within the system field of view.

As seen in FIG. 2 and as described hereinabove with regard to FIG. 1, motion detection system 100 comprises at least one detector 102 which focusing optics (not shown) focus infra-red radiation from fields of view onto sensor 104. In accordance with a preferred embodiment of the present invention, sensor 104 includes a housing 106 defining a window 108.

Disposed within housing 106 are first and second pairs of pyro-electric elements 110, which are respectively designated L+ & L− and R+ & R−. Typically, all of the pyro-electric elements 110 are identical and their L and R designations indicate only that they are on respective left and right sides of sensor 104 as seen in enlargement A in FIG. 2.

In accordance with a preferred embodiment of the present invention, the pyro-electric elements 110 of each pair are electrically connected with opposite polarity therebetween, such that the electrically connected first pair of pyro-electric elements 110 (L+ & L−) provides a first summed signal output and local temperature compensation therefor. Similarly, the electrically connected second pair of pyro-electric elements 110 (R+ & R−) provides a second summed signal output and local temperature compensation therefor.

It is a particular feature of an embodiment of the present invention that the local temperature compensation for the two pyro-electric elements 110 in the first pair (L+ & L−) is independent of the local temperature compensation for the two pyro-electric elements 110 in said second pair (R+ & R−).

It is an important feature of this embodiment of the present invention that the housing 106 is constructed such that only one of the pyro-electric elements 110 in the first pair and only one of the pyro-electric elements in the second pair view a motion detection field of view through window 108. Housing 106 prevents infra-red radiation from the motion detection field of view in the wavelength bands of interest from reaching the other one of the pyro-electric elements 110 in each pair, here L− & R−. The pyro-electric elements 110 which are thus blocked from viewing the motion detection field of view by housing 106 provide local temperature compensation for the respective pyro-electric elements, here L+ & R+, which are within window 108 and are paired therewith.

In accordance with a preferred embodiment of the present invention a signal processor electrically receives the first and second summed signal outputs and provides an output indication of crossing of the motion detection field of view by an object having a temperature different from the ambient in the motion detection field of view.

In a simplified circuit diagram designated B in FIG. 2, it is seen that pyro-electric elements L+ & L− are electrically connected in series across a resistance 112 and together generate a signal which is the sum of their respective outputs and is supplied via a FET 114 to alarm logic 116, which includes the signal processor mentioned above. Similarly, it is seen that pyro-electric elements R+ & R− are electrically connected in series across a resistance 122 and together generate a signal which is the sum of their respective outputs and is supplied via a FET 124 to alarm logic 116.

As seen in enlargement C of FIG. 2, heat radiated from a heating element, such as a radiator, located within the field of view of pyro-electric elements L+ & R+ within window 108, is detected by pyro-electric elements 110 L+ & R+, while not being detected by pyro-electric elements 110 L− & R−.

As further shown in FIG. 2, system 100 produces similar summed L and R outputs over time, the summed L and R outputs generally corresponding to the intensity of heat radiated from the radiator over time.

As clearly shown in enlargement C, the L peaks generally correspond to the R peaks, and the time difference, delta T, between each of the L peaks and a corresponding R peak is negligible. Therefore, alarm logic 116 ascertains that there is no right to left motion or left to right motion opposite detector 102, and that the similar summed L and R outputs merely indicate the presence of a stationary thermal effect.

Figure 3:
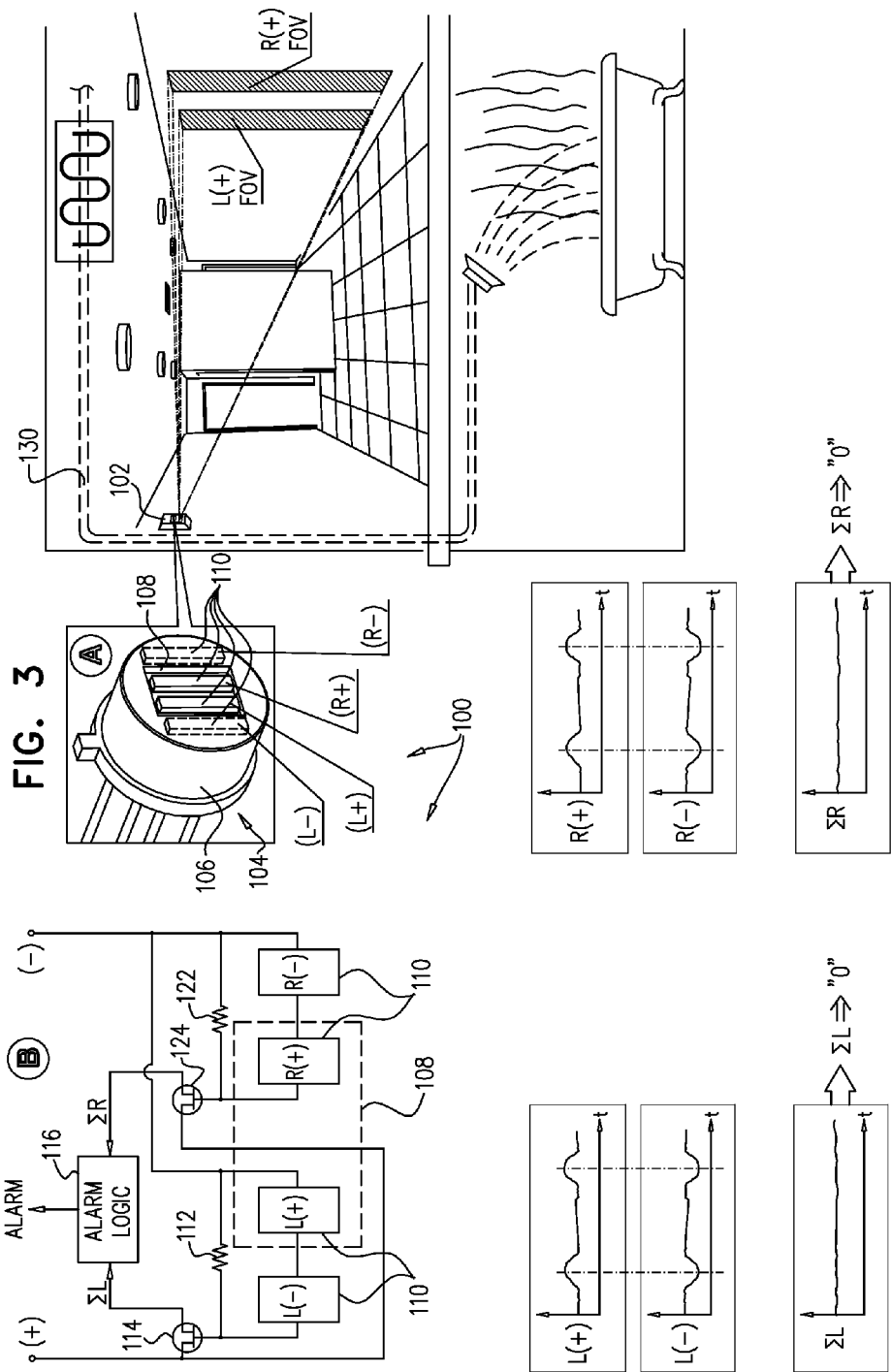
FIG. 3 is a simplified illustration of operation of the motion detection system of FIG. 1, showing how the system eliminates false alarms due to thermal effects outside the system field of view.

Reference is now made to FIG. 3, which is a simplified illustration of operation of the motion detection system of FIG. 1, showing how the system eliminates false alarms due to thermal effects outside the system field of view.

As seen in FIG. 3 and as described hereinabove with regard to FIG. 1, motion detection system 100 comprises at least one detector 102 which focusing optics (not shown) focus infrared radiation from fields of view onto sensor 104. In accordance with a preferred embodiment of the present invention, sensor 104 includes a housing 106 defining a window 108.

Disposed within housing 106 are first and second pairs of pyro-electric elements 110, which are respectively designated L+ & L− and R+ & R−. Typically, all of the pyro-electric elements 110 are identical and their L and R designations indicate only that they are on respective left and right sides of sensor 104 as seen in enlargement A in FIG. 3.

In accordance with a preferred embodiment of the present invention, the pyro-electric elements 110 of each pair are electrically connected with opposite polarity therebetween, such that the electrically connected first pair of pyro-electric elements 110 (L+ & L−) provides a first summed signal output and local temperature compensation therefor. Similarly, the electrically connected second pair of pyro-electric elements 110 (R+ & R−) provides a second summed signal output and local temperature compensation therefor.

It is a particular feature of an embodiment of the present invention that the local temperature compensation for the two pyro-electric elements 110 in the first pair (L+ & L−) is independent of the local temperature compensation for the two pyro-electric elements 110 in said second pair (R+ & R−).

It is an important feature of this embodiment of the present invention that the housing 106 is constructed such that only one of the pyro-electric elements 110 in the first pair and only one of the pyro-electric elements in the second pair view a motion detection field of view through window 108. Housing 106 prevents infra-red radiation from the motion detection field of view in the wavelength bands of interest from reaching the other one of the pyro-electric elements 110 in each pair, here L− & R−. The pyro-electric elements 110 which are thus blocked from viewing the motion detection field of view by housing 106 provide local temperature compensation for the respective pyro-electric elements, here L+ & R+, which are within window 108 and are paired therewith.

In accordance with a preferred embodiment of the present invention a signal processor electrically receives the first and second summed signal outputs and provides an output indication of crossing of the motion detection field of view by an object having a temperature different from the ambient in the motion detection field of view.

In a simplified circuit diagram designated B in FIG. 3, it is seen that pyro-electric elements L+ & L− are electrically connected in series across a resistance 112 and together generate a signal which is the sum of their respective outputs and is supplied via a FET 114 to alarm logic 116, which includes the signal processor mentioned above. Similarly, it is seen that pyro-electric elements R+ & R− are electrically connected in series across a resistance 122 and together generate a signal which is the sum of their respective outputs and is supplied via a FET 124 to alarm logic 116.

As shown in FIG. 3, a hot water pipe 130 passes behind detector 102 in close proximity thereto, thereby not passing through the field of view of pyro-electric elements L+ & R+.

As further shown in FIG. 3, it is seen that pyro-electric elements 110 L+ & R+ both generate signals which correspond to the detection of a periodic source of heat, such as heated water flowing through pipe 130. Accordingly, as described hereinabove, pyro-electric elements L− & R−, which also detect the periodic source of heat radiating from pipe 130, provide local provide local temperature compensation for corresponding pyro-electric elements L+ & R+, which are paired therewith. As a result of the compensation provided by pyro-electric elements L− & R−, the summed L and R outputs over time are generally null, which corresponds to the field of view of pyro-electric elements L+ & R+ being void of any motion, thereby eliminating a potential false alarms due to thermal effects outside the system field of view.

Figure 4:
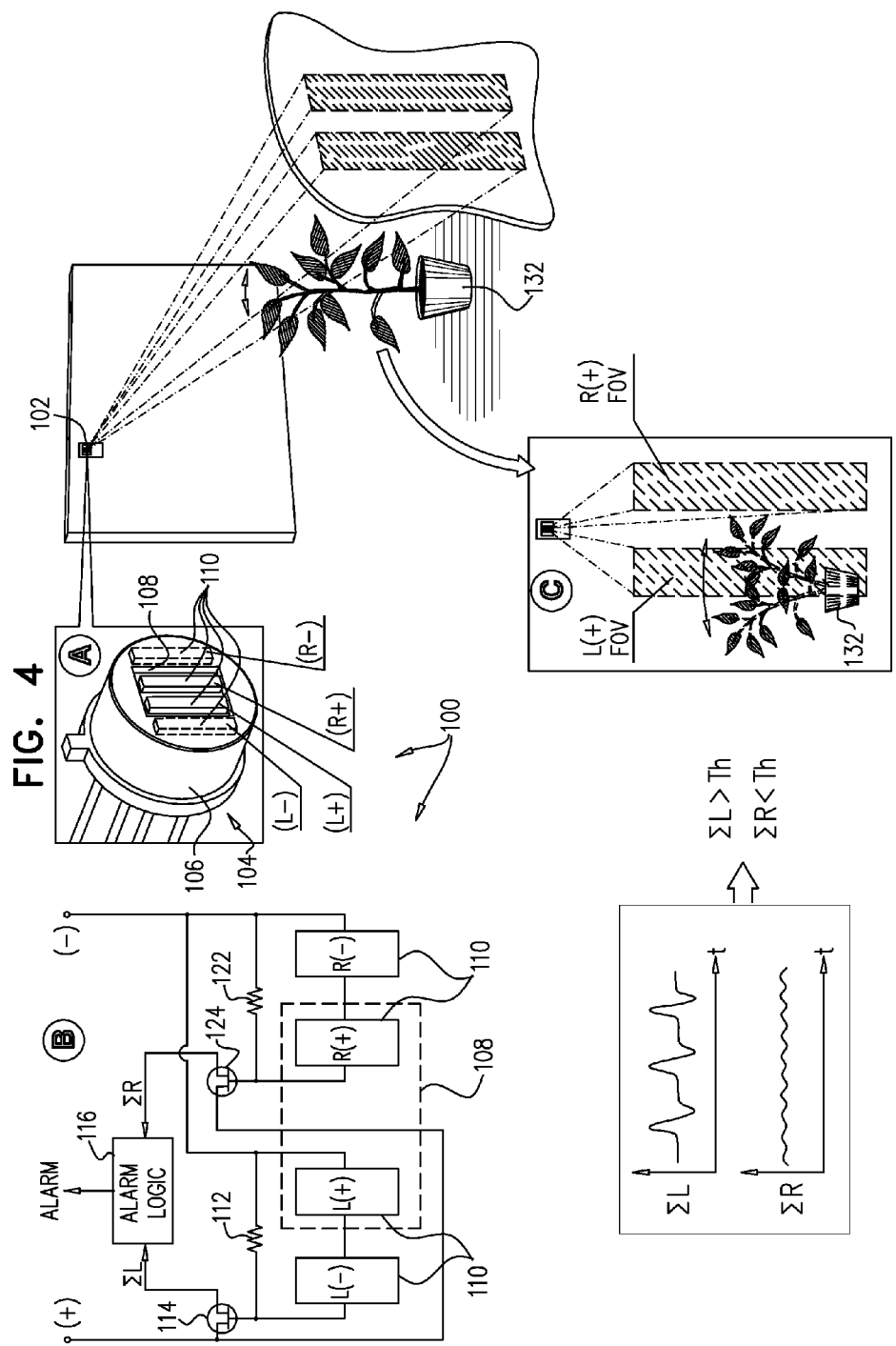
FIG. 4 is a simplified illustration of operation of the motion detection system of FIG. 1, showing how the system eliminates false alarms due to repeated back-and-forth single beam crossings.

Reference is now made to FIG. 4, which is a simplified illustration of operation of the motion detection system of FIG. 1, showing how the system eliminates false alarms due to repeated back-and-forth single beam crossings.

As seen in FIG. 4 and as described hereinabove with regard to FIG. 1, motion detection system 100 comprises at least one detector 102 which focusing optics (not shown) focus infra-red radiation from fields of view onto sensor 104. In accordance with a preferred embodiment of the present invention, sensor 104 includes a housing 106 defining a window 108.

Disposed within housing 106 are first and second pairs of pyro-electric elements 110, which are respectively designated L+ & L− and R+ & R−. Typically, all of the pyro-electric elements 110 are identical and their L and R designations indicate only that they are on respective left and right sides of sensor 104 as seen in enlargement A in FIG. 4.

In accordance with a preferred embodiment of the present invention, the pyro-electric elements 110 of each pair are electrically connected with opposite polarity therebetween, such that the electrically connected first pair of pyro-electric elements 110 (L+ & L−) provides a first summed signal output and local temperature compensation therefor. Similarly, the electrically connected second pair of pyro-electric elements 110 (R+ & R−) provides a second summed signal output and local temperature compensation therefor.

It is a particular feature of an embodiment of the present invention that the local temperature compensation for the two pyro-electric elements 110 in the first pair (L+ & L−) is independent of the local temperature compensation for the two pyro-electric elements 110 in said second pair (R+ & R−).

It is an important feature of this embodiment of the present invention that the housing 106 is constructed such that only one of the pyro-electric elements 110 in the first pair and only one of the pyro-electric elements in the second pair view a motion detection field of view through window 108. Housing 106 prevents infra-red radiation from the motion detection field of view in the wavelength bands of interest from reaching the other one of the pyro-electric elements 110 in each pair, here L− & R−. The pyro-electric elements 110 which are thus blocked from viewing the motion detection field of view by housing 106 provide local temperature compensation for the respective pyro-electric elements, here L+ & R+, which are within window 108 and are paired therewith.

In accordance with a preferred embodiment of the present invention a signal processor electrically receives the first and second summed signal outputs and provides an output indication of crossing of the motion detection field of view by an object having a temperature different from the ambient in the motion detection field of view.

In a simplified circuit diagram designated B in FIG. 4, it is seen that pyro-electric elements L+ & L− are electrically connected in series across a resistance 112 and together generate a signal which is the sum of their respective outputs and is supplied via a FET 114 to alarm logic 116, which includes the signal processor mentioned above. Similarly, it is seen that pyro-electric elements R+ & R− are electrically connected in series across a resistance 122 and together generate a signal which is the sum of their respective outputs and is supplied via a FET 124 to alarm logic 116.

As seen in enlargement C of FIG. 4, a plant 132 is located in the field of view of pyro-electric element L+, whereby the leaves of plant 132 follow a back-and-forth motion through the field of view of pyro-electric element L+.

As further shown in FIG. 4, system 100 produces summed L and R outputs over time. The summed L output comprises several peaks and is larger than a predefined threshold Th, thereby corresponding to motion of the leaves of plant 132 through the field of view of pyro-electric element L+ over time. Contrarily, the summed R output is lower than the predefined threshold Th, thereby corresponding to an empty field of view of pyro-electric element R+. Therefore, alarm logic 116 ascertains that there is no right to left motion or left to right motion opposite detector 102, and that the summed L output merely indicates the presence of an object which follows a repeated back-and-forth single beam crossing within the field of view of pyro-electric element L+.

Reference is now made to FIG. 5 which is a simplified illustration of operation of the motion detection system of FIG. 1, showing how the system eliminates false alarms due to repeated back-and-forth crossings.

As seen in FIG. 5 and as described hereinabove with regard to FIG. 1, motion detection system 100 comprises at least one detector 102 which focusing optics (not shown) focus infra-red radiation from fields of view onto sensor 104. In accordance with a preferred embodiment of the present invention, sensor 104 includes a housing 106 defining a window 108.

Disposed within housing 106 are first and second pairs of pyro-electric elements 110, which are respectively designated L+ & L− and R+ & R−. Typically, all of the pyro-electric elements 110 are identical and their L and R designations indicate only that they are on respective left and right sides of sensor 104 as seen in enlargement A in FIG. 5.

In accordance with a preferred embodiment of the present invention, the pyro-electric elements 110 of each pair are electrically connected with opposite polarity therebetween, such that the electrically connected first pair of pyro-electric elements 110 (L+ & L−) provides a first summed signal output and local temperature compensation therefor. Similarly, the electrically connected second pair of pyro-electric elements 110 (R+ & R−) provides a second summed signal output and local temperature compensation therefor.

It is a particular feature of an embodiment of the present invention that the local temperature compensation for the two pyro-electric elements 110 in the first pair (L+ & L−) is independent of the local temperature compensation for the two pyro-electric elements 110 in said second pair (R+ & R−).

It is an important feature of this embodiment of the present invention that the housing 106 is constructed such that only one of the pyro-electric elements 110 in the first pair and only one of the pyro-electric elements in the second pair view a motion detection field of view through window 108. Housing 106 prevents infra-red radiation from the motion detection field of view in the wavelength bands of interest from reaching the other one of the pyro-electric elements 110 in each pair, here L− & R−. The pyro-electric elements 110 which are thus blocked from viewing the motion detection field of view by housing 106 provide local temperature compensation for the respective pyro-electric elements, here L+ & R+, which are within window 108 and are paired therewith.

In accordance with a preferred embodiment of the present invention a signal processor electrically receives the first and second summed signal outputs and provides an output indication of crossing of the motion detection field of view by an object having a temperature different from the ambient in the motion detection field of view.

In a simplified circuit diagram designated B in FIG. 5, it is seen that pyro-electric elements L+ & L− are electrically connected in series across a resistance 112 and together generate a signal which is the sum of their respective outputs and is supplied via a FET 114 to alarm logic 116, which includes the signal processor mentioned above. Similarly, it is seen that pyro-electric elements R+ & R− are electrically connected in series across a resistance 122 and together generate a signal which is the sum of their respective outputs and is supplied via a FET 124 to alarm logic 116.

As seen in enlargement C of FIG. 5, a plant 134 is located in the motion detection field of view of window 108, partly in the field of view of pyro-electric element L+ and partly in the field of view of pyro-electric element R+, whereby the leaves of plant 134 alternately follow a back-and-forth motion through both the field of view of pyro-electric element L+ and of pyro-electric element R+.

As further shown in FIG. 5, system 100 produces summed L and R outputs over time. The summed L output corresponds to the motion of the leaves of plant 134 through the field of view of pyro-electric element L+ over time, and the summed R output corresponds to the motion of the leaves of plant 134 through the field of view of pyro-electric element R+ over time. As clearly shown, the L peak initially leads the R peak, and thereafter lags behind the R peak, thereby leading alarm logic 116 to ascertain that the plant initially follows a left to right movement and then reverts to a right to left movement. Alarm logic 116 therefore eliminates a potential false alarm due to repeated back-and-forth crossings of the plant.

Figure 6A:
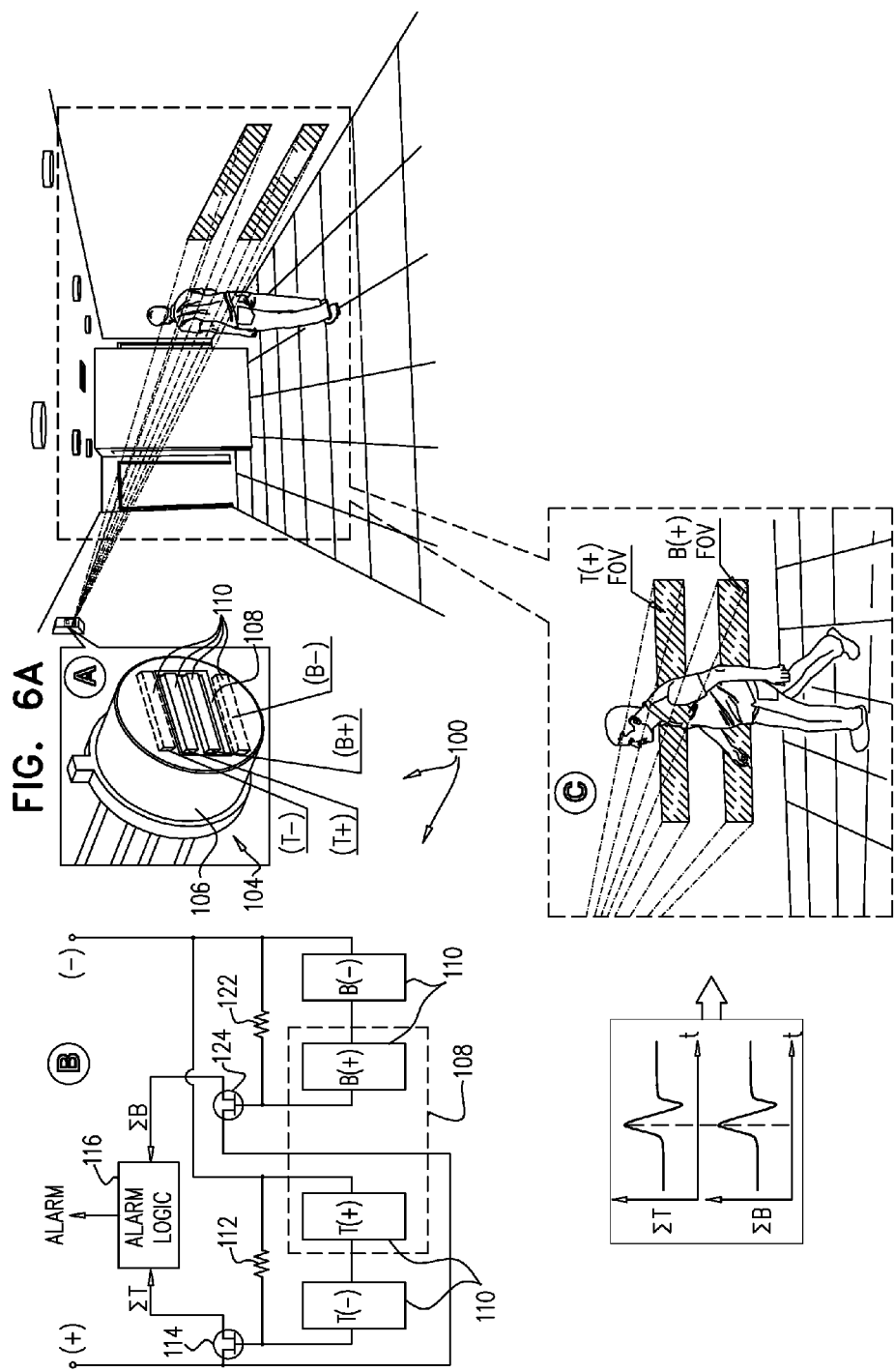

Reference is now made to FIGS. 6A and 6B, which are simplified illustrations of operation of the motion detection system, showing how the system differentiates between a crossing of a human and a crossing of a pet.

As seen in FIGS. 6A and 6B and as described hereinabove with regard to FIG. 1, motion detection system 100 comprises at least one detector 102 which focusing optics (not shown) focus infra-red radiation from fields of view onto sensor 104. In accordance with a preferred embodiment of the present invention, sensor 104 includes a housing 106 defining a window 108.

Disposed within housing 106 are first and second pairs of pyro-electric elements 110, which are respectively designated T+ & T− and B+ & B−. Typically, all of the pyro-electric elements 110 are identical and their T and B designations indicate only that they are on respective top and bottom sides of sensor 104 as seen in enlargement A in FIGS. 6A and 6B.

In accordance with a preferred embodiment of the present invention, the pyro-electric elements 110 of each pair are electrically connected with opposite polarity therebetween, such that the electrically connected first pair of pyro-electric elements 110 (T+ & T−) provides a first summed signal output and local temperature compensation therefor. Similarly, the electrically connected second pair of pyro-electric elements 110 (B+ & B−) provides a second summed signal output and local temperature compensation therefor.

It is a particular feature of an embodiment of the present invention that the local temperature compensation for the two pyro-electric elements 110 in the first pair (T+ & T−) is independent of the local temperature compensation for the two pyro-electric elements 110 in said second pair (B+ & B−).

It is an important feature of this embodiment of the present invention that the housing 106 is constructed such that only one of the pyro-electric elements 110 in the first pair and only one of the pyro-electric elements in the second pair view a motion detection field of view through window 108. Housing 106 prevents infra-red radiation from the motion detection field of view in the wavelength bands of interest from reaching the other one of the pyro-electric elements 110 in each pair, here T− & B−. The pyro-electric elements 110 which are thus blocked from viewing the motion detection field of view by housing 106 provide local temperature compensation for the respective pyro-electric elements, here T+ & B+, which are within window 108 and are paired therewith.

In accordance with a preferred embodiment of the present invention a signal processor electrically receives the first and second summed signal outputs and provides an output indication of crossing of the motion detection field of view by an object having a temperature different from the ambient in the motion detection field of view.

In a simplified circuit diagram designated B in FIGS. 6A & 6B, it is seen that pyro-electric elements T+ & T− are electrically connected in series across a resistance 112 and together generate a signal which is the sum of their respective outputs and is supplied via a FET 114 to alarm logic 116, which includes the signal processor mentioned above. Similarly, it is seen that pyro-electric elements B+ & B− are electrically connected in series across a resistance 122 and together generate a signal which is the sum of their respective outputs and is supplied via a FET 124 to alarm logic 116.

As seen in enlargement C of FIG. 6A, a person walks across the field of view of detector 102, thereby crossing the field of view of pyro-electric element T+ and the field of view of pyro-electric element B+.

As further shown in FIG. 6A, system 100 produces summed T and B outputs over time. The summed T output corresponds to the motion of the person through the field of view of pyro-electric element T+ over time, and the summed B output corresponds to the motion of the person through the field of view of pyro-electric element B+ over time. As clearly shown, the T output and the B output both peak at the same time, corresponding to the simultaneously crossing of a relatively tall object, such as a person, through the fields of view of pyro-electric elements T+ and B+.

Turning now to FIG. 6B, it is shown that a pet, such as a dog walks across the field of view of detector 102, thereby crossing the field of view of the lower pyro-electric element B+ while not crossing the field of view of the upper pyro-electric element T+.

As further shown in FIG. 6B, system 100 produces summed T and B outputs over time. The summed T output corresponds to motion through the field of view of pyro-electric element T+ over time, while the summed T output corresponds to motion through the field of view of pyro-electric element B+ over time. As clearly shown, the T output is generally null while the B output comprises a peak which corresponds to an object crossing the field of view of pyro-electric element B+. Crossing of the field of view of pyro-electric element B+ while not crossing the field of view of pyro-electric element T+ corresponds to the crossing of a relatively short object, such as a dog, through the field of view of detector 102.

Reference is now made to FIG. 7, which is a simplified illustration of operation of the motion detection system of FIG. 1, showing how the system detects a crossing in a single direction at a high angular velocity.

As seen in FIG. 7 and as described hereinabove with regard to FIG. 1, motion detection system 100 comprises at least one detector 102 which focusing optics (not shown) focus infra-red radiation from fields of view onto sensor 104. In accordance with a preferred embodiment of the present invention, sensor 104 includes a housing 106 defining a window 108.

Disposed within housing 106 are first and second pairs of pyro-electric elements 110, which are respectively designated L+ & L− and R+ & R−. Typically, all of the pyro-electric elements 110 are identical and their L and R designations indicate only that they are on respective left and right sides of sensor 104 as seen in enlargement A in FIG. 7.

In accordance with a preferred embodiment of the present invention, the pyro-electric elements 110 of each pair are electrically connected with opposite polarity therebetween, such that the electrically connected first pair of pyro-electric elements 110 (L+ & L−) provides a first summed signal output and local temperature compensation therefor. Similarly, the electrically connected second pair of pyro-electric elements 110 (R+ & R−) provides a second summed signal output and local temperature compensation therefor.

It is a particular feature of an embodiment of the present invention that the local temperature compensation for the two pyro-electric elements 110 in the first pair (L+ & L−) is independent of the local temperature compensation for the two pyro-electric elements 110 in said second pair (R+ & R−).

It is an important feature of this embodiment of the present invention that the housing 106 is constructed such that only one of the pyro-electric elements 110 in the first pair and only one of the pyro-electric elements in the second pair view a motion detection field of view through window 108. Housing 106 prevents infra-red radiation from the motion detection field of view in the wavelength bands of interest from reaching the other one of the pyro-electric elements 110 in each pair, here L− & R−. The pyro-electric elements 110 which are thus blocked from viewing the motion detection field of view by housing 106 provide local temperature compensation for the respective pyro-electric elements, here L+ & R+, which are within window 108 and are paired therewith.

In accordance with a preferred embodiment of the present invention a signal processor electrically receives the first and second summed signal outputs and provides an output indication of crossing of the motion detection field of view by an object having a temperature different from the ambient in the motion detection field of view. Preferably, the signal processor is operative to provide detection of crossing the field of view by an object at an angular velocity of between 1 and 2 degrees per second.

In a simplified circuit diagram designated B in FIG. 7, it is seen that pyro-electric elements L+ & L− are electrically connected in series across a resistance 112 and together generate a signal which is the sum of their respective outputs and is supplied via a FET 114 to alarm logic 116, which includes the signal processor mentioned above. Similarly, it is seen that pyro-electric elements R+ & R− are electrically connected in series across a resistance 122 and together generate a signal which is the sum of their respective outputs and is supplied via a FET 124 to alarm logic 116.

It is further seen that the motion of a person moving from left to right as seen in enlargement C in FIG. 7, produces summed L and R outputs, which respectively comprise an L peak and an R peak. As clearly shown, the L peak leads the R peak by a time interval indicated as Delta T, and therefore indicates movement of a person from left to right in the sense of enlargement C.

Alarm logic 116 is operative to ascertain that the time difference Delta T is relatively short, and therefore corresponds to a crossing in a single direction at a high angular velocity.

Figure 8A:
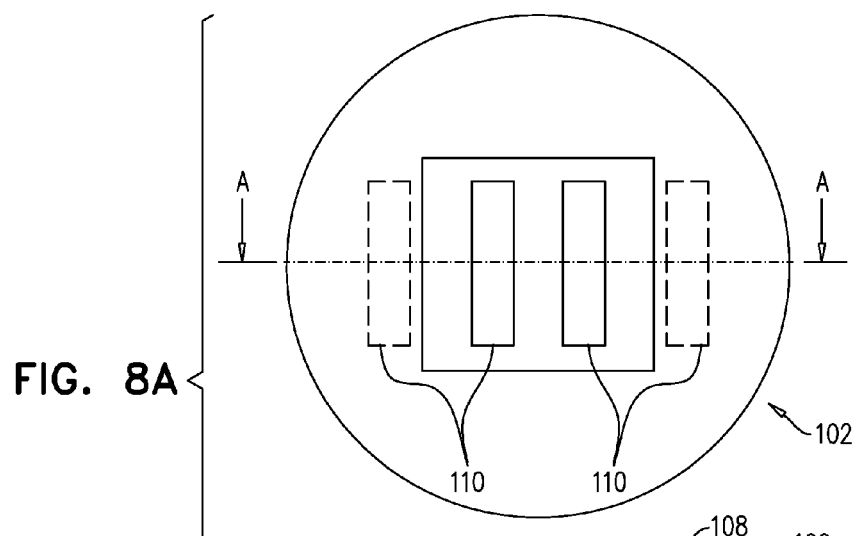
FIGS. 8A and 8B are simplified pictorial and sectional illustrations of two alternative arrangements of pyro-electric elements useful in the system of FIGS. 1-7.
Figure 8B:
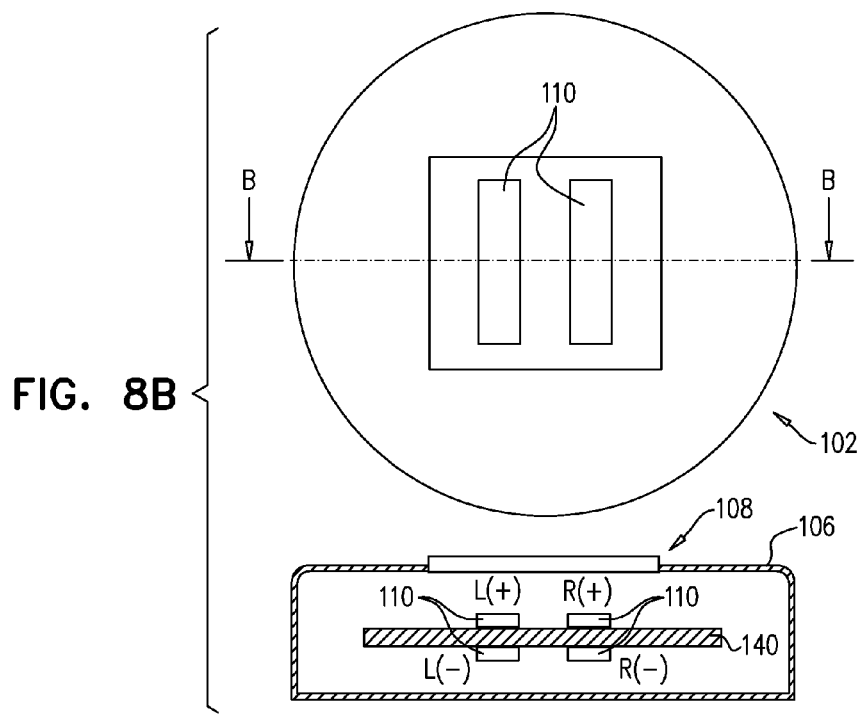

Reference is now made to FIGS. 8A and 8B, which are simplified pictorial and sectional illustrations of two alternative arrangements of pyro-electric elements useful in the system of FIGS. 1-7.

As seen in FIG. 8A and as described hereinabove with regard to FIG. 1, the motion detection system comprises at least one detector 102 comprising focusing optics (not shown) which focus infra-red radiation from fields of view onto sensor 104. In accordance with a preferred embodiment of the present invention, sensor 104 includes a housing 106 defining a window 108.

Mounted on a forward side of a mounting element 140 within housing 106 are first and second pairs of pyro-electric elements 110, which are respectively designated L+ & L− and R+ & R−. Typically, all of the pyro-electric elements 110 are identical and their L and R designations indicate only that they are on respective left and right sides of sensor 104.

As shown in FIG. 8A, housing 106 is constructed such that only one of the pyro-electric elements 110 in the first pair, here L+, and only one of the pyro-electric elements in the second pair, here R−, view a motion detection field of view through window 108. Housing 106 prevents infra-red radiation from the motion detection field of view in the wavelength bands of interest from reaching the other one of the pyro-electric elements 110 in each pair, here L− & R+. The pyro-electric elements 110 which are thus blocked from viewing the motion detection field of view by housing 106 provide local temperature compensation for the respective pyro-electric elements, here L+ & R−, which are within window 108 and are paired therewith.

Alternatively, as shown in FIG. 8B, one of the pyro-electric elements 110 in the first pair, here L+, and one of the pyro-electric elements in the second pair, here R+, are mounted on a forward side of mounting element 140 and view a motion detection field of view through window 108. The other one of the pyro-electric elements 110 in each pair, here L− & R−, are mounted on a rearward side of mounting element 140, generally opposite pyro-electric elements L+ & R+. The pyro-electric elements 110 which are thus blocked from viewing the motion detection field of view by housing 106 provide local temperature compensation for the respective pyro-electric elements, here L− & R−, which are within window 108 and are paired therewith.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A motion detector system comprising:
    at least first and second pairs of pyro-electric elements, said first pair of pyro-electric elements including first and second pyro-electric elements, said second pair of pyro-electric elements including third and fourth pyro-electric elements;
    a housing enclosing said at least first and second pairs of pyro-electric elements and defining a window, only said first and said third pyro-electric elements viewing a motion detection field of view through said window, said second and fourth pyro-electric elements not viewing said motion detection field of view through said window;
    said first and second pyro-electric elements in said first pair of pyro-electric elements being electrically connected with opposite polarity therebetween, thereby subtracting the output of said second pyro-electric element from the output of said first pyro-electric element and thereby cancelling out temperature changes taking place within said housing, which are simultaneously sensed by said first and second pyro-electric elements, thereby providing a first summed signal output representing activity at a first portion of said motion detection field of view and a first local temperature compensation therefor;
    said third and fourth pyro-electric elements in said second pair of pyro-electric elements being electrically connected with opposite polarity therebetween, thereby subtracting the output of said fourth pyro-electric element from the output of said third pyro-electric element and thereby cancelling out temperature changes taking place within said housing, which are simultaneously sensed by said third and fourth pyro-electric elements, thereby providing a second summed signal output representing activity at a second portion of said motion detection field of view and a second local temperature compensation therefor, which second portion is different from said first portion of said motion detection field of view, said first local temperature compensation being independent of said second local temperature compensation; and
    a signal processor electrically receiving said first output and said second output and providing an output indication of crossing said motion detection field of view in a given direction by an object having a temperature different from the ambient in said motion detection field of view.

2. A motion detector system according to claim 1 and wherein said signal processor is operative to provide detection of crossing said field of view by an object at an angular velocity of between 1 and 2 degrees per second.

3. A motion detection system according to claim 1 and wherein said signal processor is operative to disregard repeated crossing of said field of view in opposite directions by an object at an angular velocity less than 0.5 degrees per second.

4. A motion detection system according to claim 1 and wherein said signal processor provides an output indication of direction of crossing said field of view by an object having a temperature different from the ambient in said field of view.

5. A motion detection system according to claim 4 and wherein said signal processor provides an alarm output indication in respect of crossing said field of view by an object having a temperature different from the ambient in said field of view in a first general direction and not in respect of crossing said field of view by an object having a temperature different from the ambient in said field of view in a second general direction opposite to said first general direction.

6. A motion detection system according to claim 4 and wherein said signal processor provides a first output indication in respect of crossing said field of view by an object having a temperature different from the ambient in said field of view in a first general direction and a second output indication in respect of crossing said field of view by an object having a temperature different from the ambient in said field of view in a second general direction opposite to said first general direction.

7. A motion detection system according to claim 4 and wherein said signal processor provides an alarm output indication in respect of crossing said field of view by an object having a temperature different from the ambient in said field of view and not in respect of a stationary object having a temperature different from the ambient in said field of view.

8. A motion detection system according to claim 4 and wherein said signal processor provides an alarm output indication in respect of crossing said field of view by an object having a temperature different from the ambient in said field of view and not in respect of a stationary object outside of said field of view having a temperature different from the ambient in said field of view.

9. A motion detection system according to claim 4 and wherein said signal processor provides an alarm output indication in respect of crossing said field of view by an object having a temperature different from the ambient in said field of view and not in respect of repeated back-and-forth crossings of said field of view by an object having a temperature different from the ambient in said field of view.

10. A motion detection system according to claim 4 and wherein said signal processor provides an alarm output indication in respect of crossing said field of view by a human and not in respect of crossing said field of view by a pet.

11. A method for detecting motion, the method comprising:
    enclosing at least first and second pairs of pyro-electric elements, said first pair of pyro-electric elements including first and second pyro-electric elements, said second pair of pyro-electric elements including third and fourth pyro-electric elements;
    defining a window, only one of said pyro-electric elements in said first pair and only one of said pyro-electric elements in said second pair viewing a motion detection field of view through said window;
    electrically interconnecting between outputs of said first and second pyro-electric elements in said first pair of pyro-electric elements with opposite polarity therebetween, thereby subtracting the output of said second pyro-electric element from the output of said first pyro-electric element and thereby cancelling out temperature changes taking place within said housing, which are simultaneously sensed by said first and second pyro-electric elements, thereby providing a first summed signal output representing activity at a first portion of said motion detection field of view and a first local temperature compensation therefor;
    electrically interconnecting between outputs of said third and fourth pyro-electric elements in said second pair of pyro-electric elements with opposite polarity therebetween, thereby subtracting the output of said fourth pyro-electric element from the output of said third pyro-electric element and thereby cancelling out temperature changes taking place within said housing, which are simultaneously sensed by said third and fourth pyro-electric elements, and thereby providing a second summed signal output representing activity at a second portion of said motion detection field of view and a second local temperature compensation therefor, which second portion is different from said first portion of said motion detection field of view, said first local temperature compensation being independent of said second local temperature compensation; and
    electrically receiving said first output and said second output and providing an output indication of crossing said motion detection field of view in a given direction by an object having a temperature different from the ambient in said motion detection field of view.

12. A method according to claim 11 and wherein said providing an output indication is responsive to detection of crossing said field of view by an object at an angular velocity of between 1 and 2 degrees per second.

13. A method according to claim 11 and also comprising disregarding repeated crossing of said field of view in opposite directions by an object at an angular velocity less than 0.5 degrees per second.

14. A method according to claim 11 and also comprising providing an output indication of direction of crossing said field of view by an object having a temperature different from the ambient in said field of view.

15. A method according to claim 14 and also comprising providing an alarm output indication in respect of crossing said field of view by an object having a temperature different from the ambient in said field of view in a first general direction and not in respect of crossing said field of view by an object having a temperature different from the ambient in said field of view in a second general direction opposite to said first general direction.

16. A method according to claim 14 and also comprising providing a first output indication in respect of crossing said field of view by an object having a temperature different from the ambient in said field of view in a first general direction and a second output indication in respect of crossing said field of view by an object having a temperature different from the ambient in said field of view in a second general direction opposite to said first general direction.

17. A method according to claim 14 and also comprising providing an alarm output indication in respect of crossing said field of view by an object having a temperature different from the ambient in said field of view and not in respect of a stationary object having a temperature different from the ambient in said field of view.

18. A method according to claim 14 and also comprising providing an alarm output indication in respect of crossing said field of view by an object having a temperature different from the ambient in said field of view and not in respect of a stationary object outside of said field of view having a temperature different from the ambient in said field of view.

19. A method according to claim 14 and also comprising providing an alarm output indication in respect of crossing said field of view by an object having a temperature different from the ambient in said field of view and not in respect of repeated back-and-forth crossings of said field of view by an object having a temperature different from the ambient in said field of view.

20. A method according to claim 14 and also comprising providing an alarm output indication in respect of crossing said field of view by a human and not in respect of crossing said field of view by a pet.

21. A pyro-electric sensor comprising:
    at least first and second pairs of pyro-electric elements, said first pair of pyro-electric elements including first and second pyro-electric elements, said second pair of pyro-electric elements including third and fourth pyro-electric elements;
    a housing enclosing said at least first and second pairs of pyro-electric elements and defining a window, only said first and said third pyro-electric elements viewing a motion detection field of view through said window, said second and fourth pyro-electric elements not viewing said motion detection field of view through said window;
    said first and second-pyro-electric elements in said first pair of pyro-electric elements being electrically connected with opposite polarity therebetween, thereby subtracting the output of said second pyro-electric element from the output of said first pyro-electric element and thereby cancelling out temperature changes taking place within said housing, which are simultaneously sensed by said first and second pyro-electric elements, thereby providing a first summed signal output representing activity at a first portion of said motion detection field of view and a first local temperature compensation therefor; and said third and fourth-pyro-electric elements in said second pair of pyro-electric elements being electrically connected with opposite polarity therebetween, thereby subtracting the output of said fourth pyro-electric element from the output of said third pyro-electric element and thereby cancelling out temperature changes taking place within said housing, which are simultaneously sensed by said third and fourth pyro-electric elements, thereby providing a second summed signal output representing activity at a second portion of said motion detection field of view and a second local temperature compensation therefor, which second portion is different from said first portion of said motion detection field of view, said first local temperature compensation being independent of said second local temperature compensation.

22. A method for pyro-electric sensing, the method comprising:

enclosing at least first and second pairs of pyro-electric elements, said first pair of pyro-electric elements including first and second pyro-electric elements, said second pair of pyro-electric elements including third and fourth pyro-electric elements;

defining a window, only one of said pyro-electric elements in said first pair and only one of said pyro-electric elements in said second pair viewing a motion detection field of view through said window;

electrically interconnecting between outputs of said first and second pyro-electric elements in said first pair of pyro-electric elements with opposite polarity therebetween, thereby subtracting the output of said second pyro-electric element from the output of said first pyro-electric element and thereby cancelling out temperature changes taking place within said housing, which are simultaneously sensed by said first and second pyro-electric elements, thereby providing a first summed signal output representing activity at a first portion of said motion detection field of view and a first local temperature compensation therefor;

electrically interconnecting between outputs of said third and fourth pyro-electric elements in said second pair of pyro-electric elements with opposite polarity therebetween, thereby subtracting the output of said fourth pyro-electric element from the output of said third pyro-electric element and thereby cancelling out temperature changes taking place within said housing, which are simultaneously sensed by said third and fourth pyro-electric elements, thereby providing a second summed signal output representing activity at a second portion of said motion detection field of view and a second local temperature compensation therefor, which second portion is different from said first portion of said motion detection field of view, said first local temperature compensation being independent of said second local temperature compensation.

23. A motion detector system comprising:

first and second pyro-electric elements, viewing a motion detection field of view;

at least a third pyro-electric element, not viewing said motion detection field of view;

a housing enclosing said first, second and third pyro-electric elements and defining a window, only said first and said second pyro-electric elements viewing said motion detection field of view through said window;

said first and at least third pyro-electric elements being electrically connected with opposite polarity therebetween, thereby subtracting the output of said at least third pyro-electric element from the output of said first pyro-electric element and thereby cancelling out temperature changes taking place within said housing, which are simultaneously sensed by said first and said at least third pyro-electric elements, thereby providing a first summed signal output representing activity at a first portion of said motion detection field of view and a first local temperature compensation therefor;

said second and at least third pyro-electric elements being electrically connected with opposite polarity therebetween, thereby subtracting the output of said at least third pyro-electric element from the output of said second pyro-electric element and thereby cancelling out temperature changes taking place within said housing, which are simultaneously sensed by said first and said at least third pyro-electric elements, thereby providing a second summed signal output representing activity at a second portion of said motion detection field of view and a second local temperature compensation therefor, said first local temperature compensation being independent of said second local temperature compensation; and a signal processor electrically receiving said first output and said second output and providing an output indication of crossing said motion detection field of view by an object having a temperature different from the ambient in said motion detection field of view.

* * * * *